T. H. FREEMAN.
HORSESHOE.
APPLICATION FILED DEC. 13, 1920.

1,378,779. Patented May 17, 1921.

Inventor
T. H. Freeman

By Mason Fenwick Lawrence,
Attorneys

UNITED STATES PATENT OFFICE.

THOMAS H. FREEMAN, OF LYNCH MINES, KENTUCKY.

HORSESHOE.

1,378,779.  Specification of Letters Patent.  Patented May 17, 1921.

Original application filed October 4, 1919, Serial No. 328,377. Divided and this application filed December 13, 1920. Serial No. 430,354.

*To all whom it may concern:*

Be it known that I, THOMAS H. FREEMAN, a citizen of the United States, residing at Lynch Mines, in the county of Harlan and State of Kentucky, have invented certain new and useful Improvements in Horseshoes; and I do hereby declare the following to be a full, clear, and exact description of the invention, such as will enable others skilled in the art to which it appertains to make and use the same.

This application is a division of my application Serial No. 328,377, filed October 4, 1919, and patented November 23, 1920, as Number 1,360,204.

An object of the invention is to provide a comfortable shoe for a horse or mule that affords the animal a good hold upon the ground without raising his toe abnormally above the surface upon which he is walking. A further object is to produce a form of horseshoe that may be manufactured economically.

The invention comprises a horseshoe having a toe calk and a cavity in the thread surface of the shoe rearward of the base of the calk, whereby a firm hold upon the ground may be obtained by the animal, wearing a shoe with a shallow calk, because not only does the calk penetrate the ground to a depth determined by the extent of the projection of its edge beyond the tread surface of the shoe, but the material of the ground or other surface upon which the animal is traveling is pressed up into the cavity and affords additional hold to prevent slipping; thus with the same extent of projection of calk as in prior shoes, a better grip may be obtained, or an equal grip with a shallower calk, resulting in greater comfort for the animal.

Figure 1:
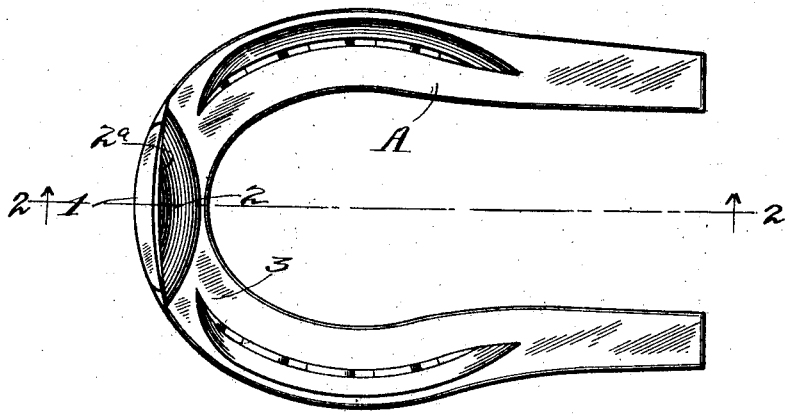
Figure 1 is a plan view of an improved shoe viewed from the under side, or looking toward the tread surface.
Figure 2:
Fig. 2 is a sectional view on the line 2—2 of Fig. 1.
Figure 3:
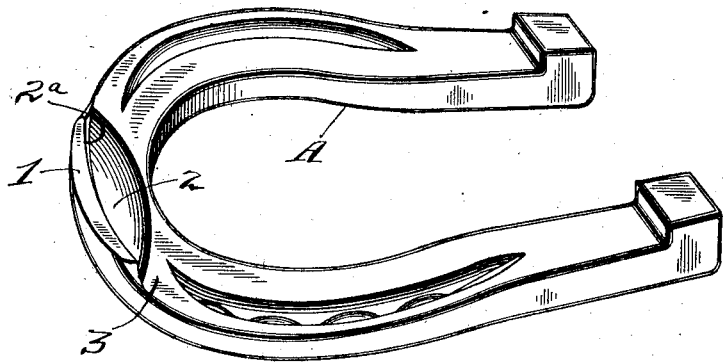
Fig. 3 is a perspective of the improved shoe.

In said drawings the shoe or shoe blank as a whole is indicated by the letter A. The toe calk 1 is formed integrally with the body of the shoe and is, preferably, projected above the tread surface to a suitable extent sufficient to accomplish the purposes of my invention, but not, as will be observed, to an excessive extent or to the extent customary in shoes having calks designed to give a firm grip on slippery ground. Rearward of the calk is a depression or cavity 2 preferably forged into the tread surface of the shoe, in such manner as to strike up the calk. The front wall of the depression coincides with the rear wall $2^a$ of the calk. By the described construction an extent of rear wall is provided on the calk 1 which is practically twice as great as in a calk projecting to the same height above the tread surface if there were no depression 2, and the toe of the horse is therefore not lifted abnormally from the ground. A horse or mule when walking not having to exert a strong pull, does not dig his toes into the ground. The presence of a long calk is undesirable for a normally walking animal. When, however, a horse or mule is pulling hard he digs his toes into the earth. At such times an animal wearing my improved shoe can obtain as good a hold upon the surface as he can with shoes with the customary long calk, while at the same time the animal may be comfortable when walking easily and dragging no heavy load.

A horseshoe having the defined structure may be manufactured in any suitable manner. I prefer to form the calk from ordinary curved horseshoe blanks by a forging operation, the metal being displaced from the cavity 2 and caused to flow into the part forming the calk 1, as is fully disclosed and claimed in my aforesaid patent, of which this application is a division.

I have found that this calk does not wear away as quickly as ordinary calks since the cavity in its rear with its front wall merging into the rear wall of the calk tends to keep said calk sharp. Even when calk 1 is worn down flush with the tread surface 3 of the shoe A it still has a very considerable holding capacity and gives the animal a good grip upon the ground in the effort to get a firm footing. The calk 1 may be originally formed so as to extend flush with the tread surface of the shoe, and still possess good ground-gripping capacity owing to the presence of the cavity.

The said cavity or depression rearward of the calk is additional to and wider than the usual nail creases and separate therefrom.

Having described my invention in such manner as to enable those skilled in the art to make and use the same, what I claim and desire to secure by Letters Patent is:

1. A horseshoe having the usual nail creases and a depression in its general tread surface adjacent the toe of the shoe additional to and wider than the nail creases, that portion between the front wall of the depression and the front of the shoe forming a calk.

2. A horseshoe having a calk projecting beyond the general tread surface of the shoe, and a depression in said general tread surface rearward of said calk, said calk having its rear wall merging into the front wall of said depression.

In testimony whereof I affix my signature.

THOMAS H. FREEMAN.